United States Patent
Crapanzano et al.

(10) Patent No.: US 10,751,696 B2
(45) Date of Patent: Aug. 25, 2020

(54) COMPOSITION FOR AMBIENT MOISTURE REGULATION, METHOD OF PREPARATION THEREOF AND USE THEREOF TO REGULATE THE MOISTURE OF AN ENVIRONMENT

(71) Applicant: PROPAGROUP S.p.A., Rivoli (IT)

(72) Inventors: Salvatore Davide Crapanzano, Rivoli (IT); Donato Cocina, Rivoli (IT); Dante Vaula, Rivoli (IT)

(73) Assignee: Dayco Europe S.R.L, Chieti (IT)

( * ) Notice: Subject to any disclaimer, the term of this patent is extended or adjusted under 35 U.S.C. 154(b) by 147 days.

(21) Appl. No.: 15/871,921

(22) Filed: Jan. 15, 2018

(65) Prior Publication Data

US 2018/0133689 A1  May 17, 2018

Related U.S. Application Data

(62) Division of application No. 14/767,455, filed as application No. PCT/IB2014/058980 on Feb. 13, 2014, now abandoned.

(30) Foreign Application Priority Data

Feb. 13, 2013 (IT) .............................. TO2013A0116

(51) Int. Cl.
| | | |
|---|---|---|
| *B01J 20/28* | (2006.01) | |
| *B01J 20/04* | (2006.01) | |
| *B01J 20/26* | (2006.01) | |
| *B01J 20/24* | (2006.01) | |
| *B65D 65/42* | (2006.01) | |
| *B65D 81/26* | (2006.01) | |
| *B01D 53/02* | (2006.01) | |

(52) U.S. Cl.
CPC ....... *B01J 20/28047* (2013.01); *B01J 20/046* (2013.01); *B01J 20/24* (2013.01); *B01J 20/265* (2013.01); *B65D 65/42* (2013.01); *B65D 81/264* (2013.01); *B01D 53/02* (2013.01); *B01D 2253/25* (2013.01); *B01D 2257/80* (2013.01); *B01J 2220/46* (2013.01); *B01J 2220/4831* (2013.01)

(58) Field of Classification Search
CPC ...................................................... B01J 20/046
See application file for complete search history.

(56) References Cited

U.S. PATENT DOCUMENTS

| 7,326,363 B2 | 2/2008 | Faust et al. |
| 7,927,655 B2 | 4/2011 | Lee |
| 2008/0245289 A1 | 10/2008 | Shiraishi |

FOREIGN PATENT DOCUMENTS

| CN | 101585696 | 11/2009 |
| JP | H01-189328 | 7/1989 |
| JP | 2010-194497 | 9/2010 |
| WO | 2003/063918 A1 | 8/2003 |
| WO | 2005/087364 A1 | 9/2005 |
| WO | 2006/112690 A1 | 10/2006 |

OTHER PUBLICATIONS

PCT, International Search Report and Written Opinion, International Application No. PCT/IB2014/058980, dated May 13, 2014.
Second Office Action Issued in CN 2017050501366800, dated May 10, 2017; Applicant: Propagroup S.P.A. (8 pages).
Third Office Action issued in CN 201480008568.6 dated Oct. 19, 2017; Application: Propagroup S.P.A. (10 pages).
Office Action issued in JP 2015-557550, dated Mar. 12, 2018 (10 pages, including English Translation).

*Primary Examiner* — Peter F Godenschwager
(74) *Attorney, Agent, or Firm* — FisherBroyles, LLP; Susan M. Oiler

(57) ABSTRACT

A composition for moisture regulation in the form of a gel is disclosed. The composition includes magnesium chloride, and a cellulose selected from hydroxypropyl methyl cellulose and methyl hydroxyethyl cellulose and water, in which the ratio between the quantity of magnesium chloride and the cellulose is between 0.1 and 16 by weight. Preparation methods for such composition and methods for regulating the moisture of an environment are also disclosed.

7 Claims, 3 Drawing Sheets

COMPOSITION FOR AMBIENT MOISTURE REGULATION, METHOD OF PREPARATION THEREOF AND USE THEREOF TO REGULATE THE MOISTURE OF AN ENVIRONMENT

RELATED APPLICATIONS

This application is a divisional of U.S. application Ser. No. 14/767,455, filed Aug. 12, 2015, which is a national stage entry of International Patent Application No. PCT/IB2014/058980, filed Feb. 13, 2014, which claims priority to Italian Patent Application No. TO2013A000116, filed Feb. 13, 2013.

TECHNICAL FIELD

The present invention relates to a composition for moisture regulation in closed environments, such as packaging, containers, boxes or even shoes, for example.

BACKGROUND ART

It is known that the presence of excess moisture can affect the condition of numerous products due to the formation of fungi, mould, bad smells or condensation.

At the same time, an environment that is too dry is harmful to other materials. In these conditions, for example, the state of wooden musical instruments can be affected and the flavour and fragrance of foods and spices is altered.

To reduce the moisture in a closed system, desiccating materials are commonly used, generally supplied in breathable bags. The most commonly used include silica gel, activated clay and hygroscopic salts.

However, the limits that make these materials unsuitable for use as moisture regulators are numerous. Firstly, they capture the moisture (until they are completely saturated) even when not necessary, with the risk of making the environment too dry.

A second limit is their poor or null regeneration capacity (i.e. moisture release) once maximum absorption has been reached. In these conditions they become unusable, and to re-activate them they have to be heated to over 100° C., with consequent high energy consumption and poor practicality in terms of use.

A third limit of some of these materials is their deliquescence, a phenomenon that consists in the formation of an aqueous solution following the absorption of moisture by a solid hygroscopic salt. In addition, said solution can contain ions which are potentially corrosive for the material to be protected.

To remedy this problem, various formulations are known in which particles of hygroscopic salt are mixed with thickening materials. However, organic thickeners such as modified starches or sugars have the unfortunate drawback of being an excellent nutrient for the development and proliferation of bacterial growth, especially if used in large quantities.

An important aspect is that the majority of the desiccating products cited above cannot be used in direct contact with food. A solution to this problem may be the use of suitable protective membranes which contain the desiccating material. In this case, however, the moisture absorption speed is inevitably reduced, and at the same time the end cost of the product increases.

In addition to the above, to raise the moisture level in a dry system, humidifiers are usually used which constantly release moisture until they become completely depleted. As described for the desiccants, also in this case the process is not controllable, with the risk of passing from an excessively dry environment to an excessively humid environment.

DISCLOSURE OF INVENTION

The object of the present invention is therefore to provide a new moisture regulation material which has a high capacity to retain or release moisture according to utilisation requirements, which is not subject to phenomena of deliquescence in all working conditions, which has a rapid regeneration capacity, and which can be used in direct contact with food.

Said object is achieved by the present invention, which relates to a moisture regulation material that comprises magnesium chloride, and a cellulose selected from hydroxypropryl methyl cellulose and methyl hydroxyethyl cellulose and water and a method for the preparation thereof. The magnesium chloride and the cellulose being present in a ratio of between 0.1 and 16 by weight. Since the moisture regulator consists of a solid material in stable gel form which maintains its form, it does not require any container, like boxes or bags, thus facilitating the use thereof.

BRIEF DESCRIPTION OF THE DRAWINGS

The present invention will be described below in detail with reference to the figures of the accompanying drawings, in which.

BEST MODE FOR CARRYING OUT THE INVENTION

Figure 1:
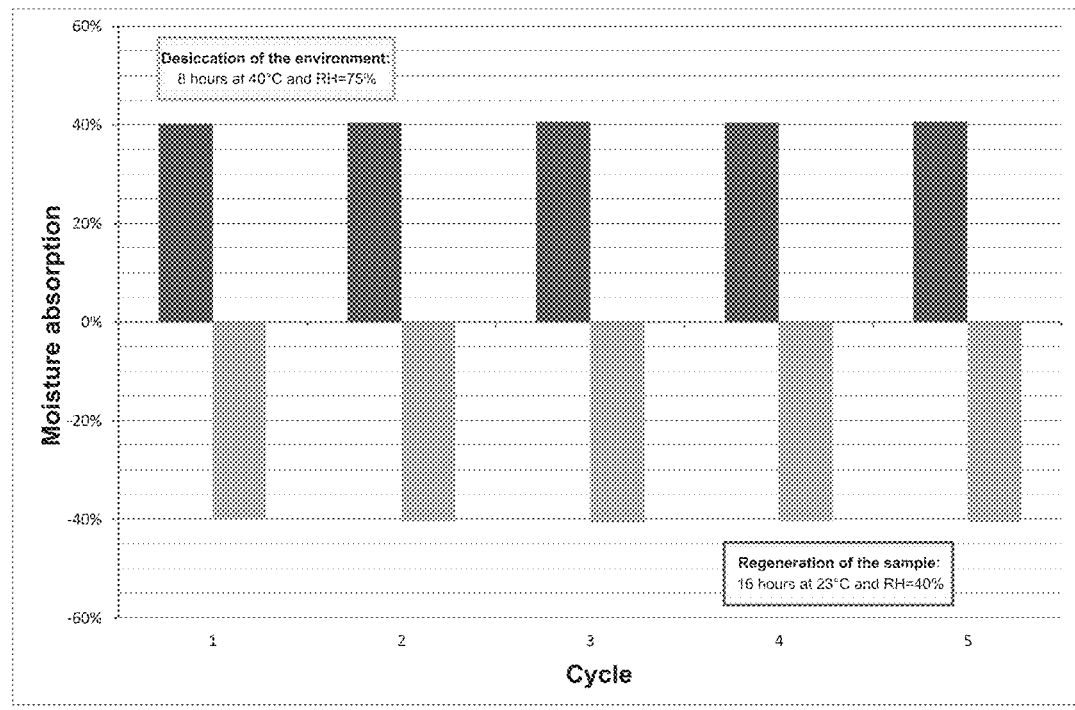
FIG. 1 illustrates the results of the test conducted in example 3.

According to a first embodiment of the invention, a composition is provided for moisture regulation in stable gel form which maintains its form consisting of magnesium chloride, a cellulose selected from hydroxypropyl methyl cellulose and methyl hydroxyethyl cellulose and water, in which the ratio between the quantity of magnesium chloride and the cellulose is between 0.1 and 16, preferably between 0.5 and 4, more preferably equal to 1.

The term "composition for moisture regulation" indicates a composition able to absorb in a first step the ambient moisture which is then released in a second step at ambient temperature without the use of ovens or high temperatures.

The composition thus obtained is in a stable gel form which maintains its form and is able to absorb moisture up to over 250% by weight in conditions of extreme relative moisture.

Advantageously, selection of the specific salt and specific gelling agent used in the above composition allows a moisture regulator to be obtained which does not have the deliquescence typical of chlorides and does not modify its aspect before and after absorption with enormous advantages in application terms. Furthermore, it consists solely of components approved by the FDA in the food sector and therefore the composition can be used in direct contact with foodstuffs or as a coating for food wrappings.

In addition, since magnesium chloride is widely used as a food supplement and the above celluloses are often applied in the pharmaceutical industry as coatings for pills and capsules, the moisture regulator described here is edible.

Preferably the composition can be used as it is or alternatively it can be used inside a wrapping, for example a container or a bag, permeable to moisture.

According to a second embodiment of the invention, a method is furthermore provided for preparation of the composition described above.

In the art, the preparation of compositions comprising hygroscopic salts and cellulose is known, as illustrated for example in U.S. Pat. No. 7,326,363 and U.S. Pat. No. 7,927,655.

The first comprises the addition of small quantities of cellulose to a solution of calcium chloride prepared previously (method in solution). As highlighted in the patent, said method has the drawback of producing a highly non-uniform sample, with the presence of lumps, which require various precautions to be taken during the production process (minimum gradual dosages of cellulose, atomisation of the solution, etc.). Consequently, said method is less effective, more costly and disadvantageous in energy terms with respect to the synthesis method of the present invention.

To remedy the drawback of non-uniformity of the sample during synthesis, the known art proposes a second dry method illustrated in U.S. Pat. No. 7,927,655. Said method comprises mixing of the two solid components which are then conditioned in a climatic chamber. Said conditioning entails two distinct steps: the first with high moisture level, for example RH=90%, and the second with low moisture and high temperature, thus roughly doubling the synthesis times.

The method of the invention overcomes the drawbacks described above.

The first step consists in the preparation of a solution obtained by dissolving the magnesium chloride in water. The solution thus obtained is heated to a temperature above 50° C., preferably 70° C. After heating, the cellulose in powder form is added by stirring. The solution thus obtained is then quenched to temperatures below 10° C., preferably below 5° C. The gel obtained is then conditioned in a climatic chamber under the desired conditions according to the final application.

Advantageously, unlike the methods used so far, by heating the solution to high temperatures before adding the gelling agent, an extremely uniform and workable solution can be obtained which is not subject to deliquescence. Furthermore, said preparation method is much cheaper and quicker than the dry preparation methods known in the art.

The product thus obtained can be used in numerous applications for moisture regulation in an environment, inside packaging, containers, boxes or even shoes.

Advantageously, further additives can be added to the composition of the invention, such as fragrances and antibacterial substances for example, in relation to the desired use.

Further characteristics of the present invention will become clear from the following description of some merely illustrative and non-limiting examples.

EXAMPLE 1

Preparation of the Composition

Various samples of the composition were prepared as described below.

A known quantity of salt is dissolved in 10 ml of demineralised water. The solution obtained is then heated in a water bath to a temperature of approximately 70° C. 1 g of hydroxypropyl methyl cellulose (HPMC) in powder is added, stirring with a rod, and the mixture thus obtained is quenched in an ice bath to a temperature of 5° C. to ensure rapid gelation.

Table 1 below illustrates the quantities used for preparation of the samples prior to conditioning.

TABLE 1

| Sample | Water (g) | $MgCl_2$ (g) | HPMC (g) | $MgCl_2$/Gel |
|---|---|---|---|---|
| C0.1 | 10.0 | 0.1 | 1.0 | 0.1 |
| C0.5 | 10.0 | 0.5 | 1.0 | 0.5 |
| C1 | 10.0 | 1.0 | 1.0 | 1 |
| C2 | 10.0 | 2.0 | 1.0 | 2 |
| C4 | 10.0 | 4.0 | 1.0 | 4 |
| C8 | 10.0 | 8.0 | 1.0 | 8 |
| C16 | 10.0 | 16.0 | 1.0 | 16 |

The samples thus obtained are conditioned in controlled atmospheres to give them the characteristics necessary for the specific use.

If said regulator has to protect a material from conditions of high moisture and avoid, for example, the formation of fungi, mould, bad smells or condensation, the conditioning parameters can have a temperature of 23° C. and a relative moisture of 40%.

After said conditioning the samples have the compositions listed in table 2.

TABLE 2

| Sample | Water (%) | $MgCl_2$ (%) | Thickener (%) | $MgCl_2$/Gel |
|---|---|---|---|---|
| C0.1-low | 34 | 6 | 60 | 0.1 |
| C0.5-low | 40 | 20 | 40 | 0.5 |
| C1-low | 54 | 23 | 23 | 1 |
| C2-low | 58 | 28 | 14 | 2 |
| C4-low | 61 | 31 | 8 | 4 |
| C8-low | 64 | 32 | 4 | 8 |
| C16-low | 66 | 32 | 2 | 16 |

Vice versa, if said regulator has to preserve conditions of high moisture, for example in the shipment and conservation of tobacco, the conditioning parameters can have a temperature of 30° C. and a relative moisture of 90%. After said conditioning, the samples have the compositions listed in table 3.

TABLE 3

| Sample | Water (%) | $MgCl_2$ (%) | Thickener (%) | $MgCl_2$/Gel |
|---|---|---|---|---|
| C0.1-high | 64 | 3 | 33 | 0.1 |
| C0.5-high | 76 | 8 | 16 | 0.5 |
| C1-high | 82 | 9 | 9 | 1 |
| C2-high | 85 | 10 | 5 | 2 |
| C4-high | 87 | 10 | 3 | 4 |
| C8-high | 87.8 | 10.8 | 1.4 | 8 |
| C16-high | 88.4 | 10.9 | 0.7 | 16 |

The suffixes "low" and "high" in tables 2 and 3 identify the quantity of water contained in the samples, due to the two different conditionings, dictated by the specific applications.

EXAMPLE 2

Maximum Absorption Test

The samples of table 2 were analysed in relation to their maximum absorption capacity when subjected to high moisture conditions. The test was performed by placing the samples in a climatic chamber at 40° C. with a relative moisture value of 75%. The results obtained are shown in table 4.

TABLE 4

| Sample | Absorption(%) |
|---|---|
| C0.1-low | 20 |
| C0.5-low | 39 |
| C1-low | 47 |
| C2-low | 52 |
| C4-low | 55 |
| C8-low | 57 |
| C16-low | 58 |

From the results obtained it can be seen that the quantity of water vapour absorbed increases as the quantity of magnesium chloride increases.

The increase in the absorption data is not linearly proportional to the increase in the quantity of magnesium chloride, since the latter determines an increase in the quantity of gelation water in the starting system.

EXAMPLE 3

Cyclic Test in Bland Conditions to Simulate an Application in which the Utilisation Time is Shorter than the Regeneration Time The sample C0.5-low of table 2 was analysed in relation to its capacity to absorb moisture in bland conditions and to regenerate at atmospheric conditions. The test was performed by placing the sample in a climatic chamber at 40° C. with a relative moisture of 75% for 8 hours, then allowing regeneration in the air for 16 hours. These conditions were chosen to simulate a relatively short utilisation condition (8 hours) as desiccant, and a longer regeneration phase (16 hours).

Said test was performed in a cyclic manner (5 cycles) to evaluate the repeatability and continuity of use of the system. The results obtained are shown in FIG. 1.

As can be seen in FIG. 1, the system is able to absorb 40% of the moisture during the ambient desiccation phases (8 h each). Said value is equal to the maximum possible quantity of moisture absorbed (see table 1) denoting an excellent response speed of the system under the ambient conditions.

This translates, during use, into a rapid conditioning of the environment thanks to the invention.

During regeneration, the system is able to return to the starting condition (complete regeneration) after 16 hours at ambient conditions. It should also be noted that the system has an identical absorption and regeneration behaviour at each analysis cycle, highlighting an extreme reversibility.

EXAMPLE 4

Cyclic Test in Stringent Conditions to Simulate an Application in which the Utilisation Time is Longer than the Regeneration Time The sample C0.5-low presented in table 2 was analysed in relation to its capacity to absorb moisture in conditions of stress and to regenerate under atmospheric conditions. The test was performed by placing the sample in a climatic chamber at 40° C. with a relative moisture of 75% for 16 hours and then allowing regeneration in the air for 8 hours. Contrarily to what was observed in the previous example, these conditions were chosen to simulate a relatively long utilisation condition (16 hours) and a shorter regeneration phase (8 hours).

Also in this case, the test was performed cyclically (5 cycles) to evaluate the repeatability and continuity of use of the system.

Figure 2:
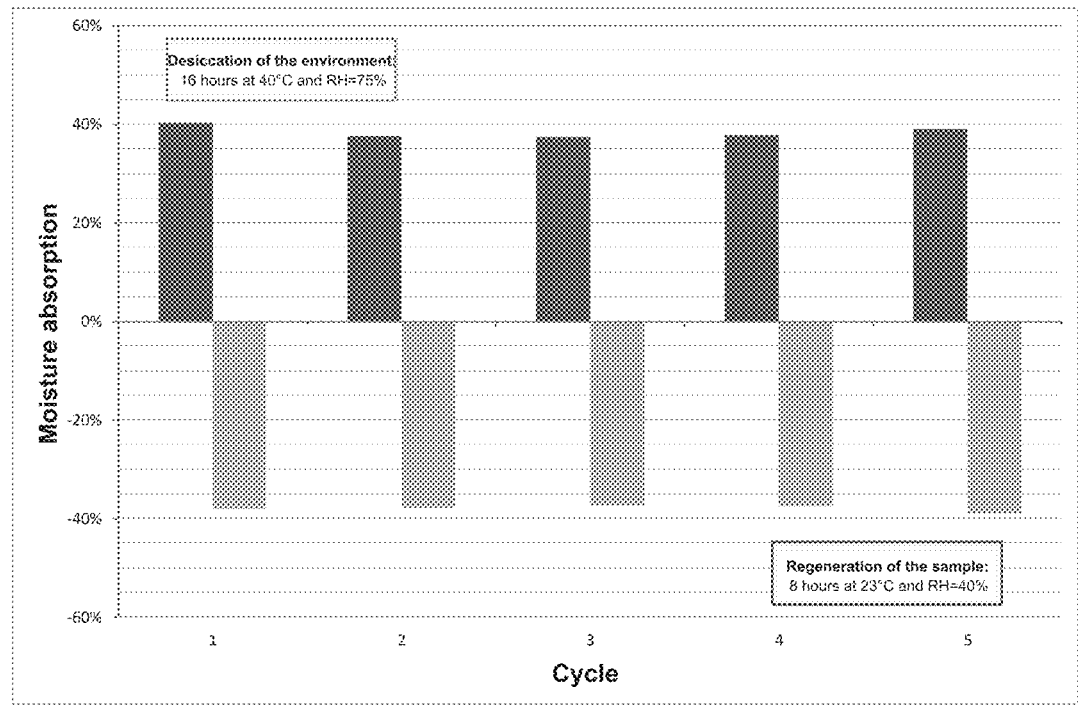
FIG. 2 illustrates the results of the test conducted in example 4.

The results obtained are shown in FIG. 2.

Also in this case, as can be seen in FIG. 2, the system is able to absorb approximately 40% of the moisture during the first cycle. As already observed previously, said value is equal to the maximum possible quantity of moisture absorbed (see table 1).

The system is able to return to the starting condition (complete regeneration) also following a short regeneration (8 hours). Said data highlights that the system is able to regenerate in a short period of time, thus optimising its use.

In FIG. 2 it can be seen that the system has an identical absorption and regeneration behaviour at each analysis cycle, highlighting an excellent reversibility.

In general, from the examples illustrated, it can be concluded that said system can be used several times without altering its characteristics regardless of the conditions of use, whether bland or stringent.

EXAMPLE 5

Maximum Desorption Test

The samples presented in table 3 were analysed in relation to their maximum capacity to release moisture when subjected to a dry environment. The test was performed by placing the samples in a climatic chamber at 23° C. with a relative moisture of 40%. The results obtained are shown in table 4.

TABLE 4

| Sample | Desorption (%) |
|---|---|
| C0.1-high | 45 |
| C0.5-high | 59 |
| C1-high | 61 |
| C2-high | 64 |
| C4-high | 65 |
| C8-high | 66 |
| C16-high | 66 |

Also in this case the quantity of water vapour desorbed increases as the quantity of magnesium chloride increases. The increase in the desorption data is not linearly proportional to the increase in the quantity of magnesium chloride.

EXAMPLE 6

Figure 3:
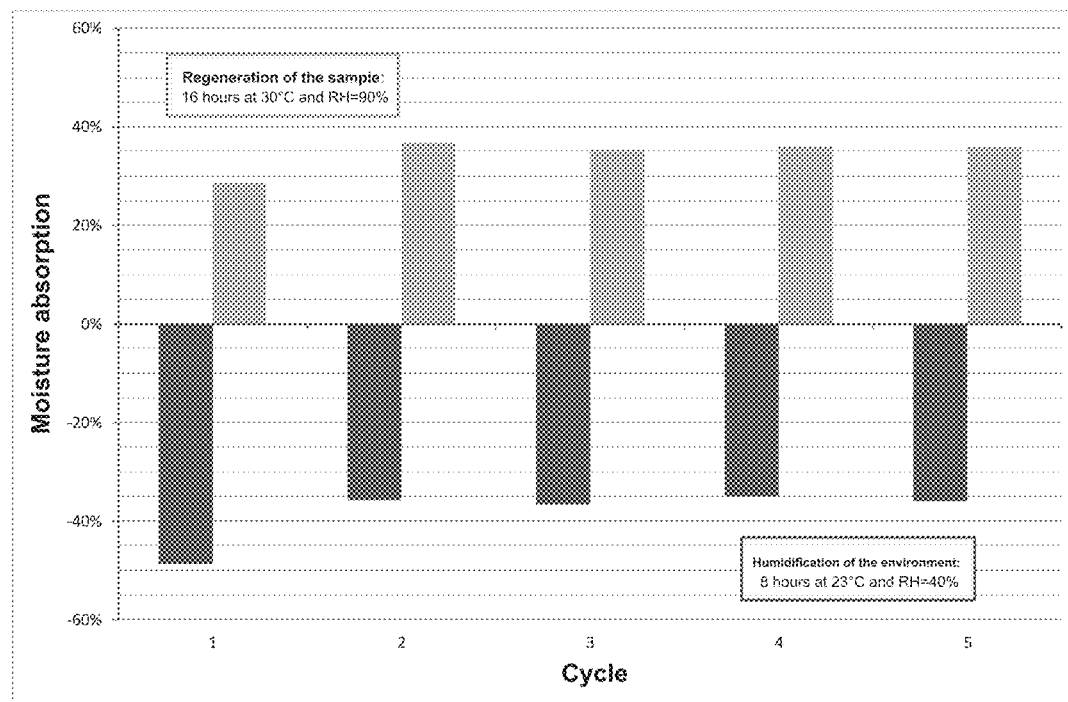
FIG. 3 illustrates the results of the test conducted in example 6.

Cyclic Test in Bland Conditions to Simulate an Application Entailing a Utilisation Time Shorter than the Regeneration Time The sample C0.5-high in table 3 was analysed in relation to its capacity to release moisture in bland utilisation conditions and to regenerate at high relative moisture. The test was performed by placing the sample in a climatic chamber at 23° C. with a relative moisture of 40% for 8 hours, then allowing regeneration for 16 hours (T=30° C., RH=90%). The results obtained are shown in FIG. 3.

Contrarily to what was discussed in examples 3 and 4, in this case the system is used as a humidifier and, consequently, in the utilisation phase denotes a weight loss (and not an increase) due to the release of moisture in the dry environment.

In general, it can be seen that during the cyclic use of the sample (5 cycles) it is able to exchange moisture with the environment for a value equal to 36% of its weight. In addition, during the first utilisation cycle, the sample shows an even greater humidification capacity with respect to the equilibrium value (36%), stabilising at a value of around 50%.

As already highlighted in the previous cyclic tests, also in this case the system maintains its characteristics unchanged over time.

EXAMPLE 7

Figure 4:
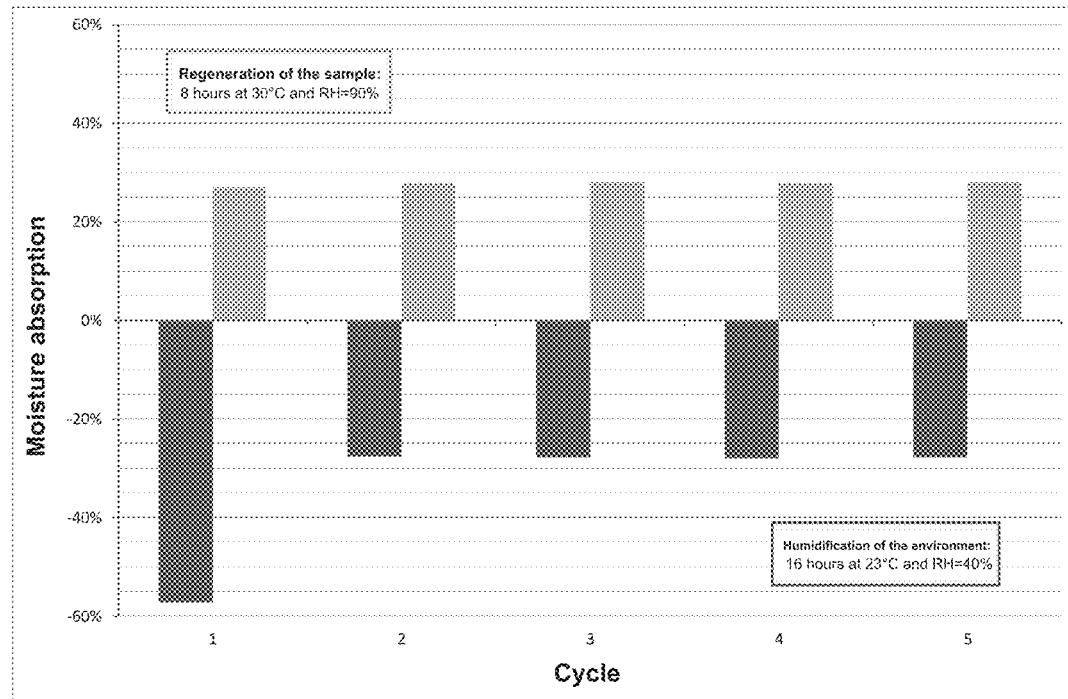
FIG. 4 illustrates the results of the test conducted in example 7.

Cyclic Test in Stringent Conditions to Simulate an Application Entailing a Utilisation Time Longer than the Regeneration Time The same sample C0.5-high as the previous example was analysed in relation to its capacity to release moisture in conditions of stress and to regenerate with high relative moisture. The test was performed by placing the sample in a climatic chamber at 23° C. with a relative moisture of 40% for 16 hours, then allowing regeneration for 8 hours (T=30° C., RH=90%). The results obtained are shown in FIG. 4.

In this case, where the stringent conditions entail a short regeneration and a long use, the sample shows a considerable dehumidification capacity. In fact, the sample is able to exchange moisture with the environment for a value equal to 28% in weight.

Also in this case, during the first utilisation cycle, the sample shows an even greater humidification capacity with respect to the equilibrium value (28%), stabilising at a value of around 57%.

As already highlighted in the previous cyclic tests, also in this case the system maintains its characteristics unchanged over time, regardless of the conditions of use, whether bland or stringent.

EXAMPLE 8

Tests for Comparison with the Known Art: Moisture Regulation in a Closed Environment A sample of moisture regulator C1 according to the invention was prepared as illustrated in example 1 with the formulation of table 1. The sample was then conditioned at 23° C. with 40% relative moisture, to operate as a moisture regulator for high ambient moisture values.

10 g of the conditioned sample, with rectangular shape and dimensions 5×4×0.2 cm$^3$, was placed in a plastic box with snap closure and an internal volume of 1.5 litres (below Box C1), verifying the internal temperature and the moisture conditions with a datalogger. A desiccating material, representative of the known art, was prepared by mixing 95% $MgCl_2$ and 5% hydroxyethyl cellulose, as described in WO2005087364. 10 g of this mixture in powder was placed in a second plastic box (below Desiccating Box) containing a T-RH datalogger, as in the previous case. A third plastic box (below Reference Box) was prepared, including only a T-RH datalogger without any desiccant or moisture regulator.

The C1 Desiccating and Reference Boxes were closed and placed in a climatic chamber, with the corresponding T-RH logger to collect data at 5 minute intervals.

Figure 5:
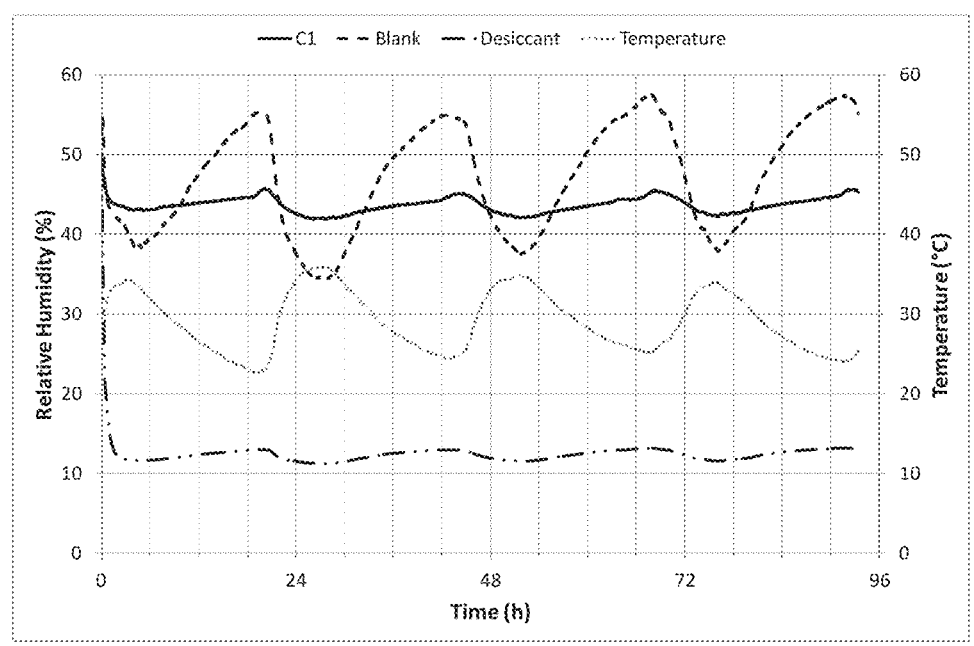
FIG. 5 illustrates the results of the comparative analyses with the systems of the known art of example 8.

A cyclic program was then started which simulates the typical day/night fluctuations in temperature and relative moisture. After 5 days, the experiment was stopped; the temperature and relative moisture data collected in the Boxes were reported in the graph of FIG. 5.

It should be noted that only the moisture regulator subject of the present invention (Box C1) is able to preserve the moisture conditions in the case of both large and small deviations. In fact, while the fluctuations in the Reference Box fall within the range 35-55%, the sample C1 shows excellent control of the moisture, maintaining it at a value of 44±1%. The sample of the Desiccating Box, on the other hand, drastically reduces the moisture in the box, maintaining it slightly below 10% for the entire duration of the experiment, clearly acting as a conventional desiccant, far from the regulation properties presented by the composition of the present invention.

EXAMPLE 9

Evaluation of Mechanical Properties

The mechanical properties of the composition of the invention were evaluated with a dynamometer according to the European standard ISO 527-3. The samples were synthesised and conditioned at 23° C. and 40% relative moisture or at 40° C. and 75% relative moisture, according to the method described in example 1. Strips were then made measuring 20×150 mm with a thickness of 2.0 mm.

These samples were placed in a dynamometer using two appropriate clamps and were subjected to a constant elongation of 100 mm/min until breakage. Said experiment allows calculation of both Young's modulus and the tensile strength which are shown in table 5.

TABLE 5

| Sample | Young's modulus (MPa) | Tensile strength (MPa) |
|---|---|---|
| C0.1-low | 10-100 | 1-10 |
| C0.5-low | 1.0-10 | 0.1-1.0 |
| C1-low | 0.1-1.0 | 0.01-0.1 |
| C2-low | 0.05-0.5 | 0.005-0.05 |
| C0.1-high | 0.1-1.0 | 0.01-0.1 |
| C0.5-high | 0.05-0.5 | 0.005-0.05 |

Considering the results obtained, the mechanical properties of the composition subject of the invention can be compared to gelatinous materials.

What is claimed:

1. A method for the preparation of a composition for moisture regulation the method comprising:
    a) dissolving magnesium chloride in water to obtain a solution;
    b) heating said solution to a temperature higher than 50° C.;
    c) adding a cellulose selected from hydroxypropyl methyl cellulose and methyl hydroxyethyl cellulose to said solution;
    d) quenching to a temperature lower than 10° C. to form a gel; and
    e) conditioning said gel in a climatic chamber to remove water to reach a preselected relative moisture content while remaining as a gel.
2. The method according to claim 1, wherein heating said solution is conducted at a temperature of 70° C.

3. The method according to claim 1, wherein quenching is conducted at a temperature lower than 5° C.

4. The method according to claim 1, wherein the gel, after conditioning in the climatic chamber, comprises a magnesium chloride to cellulose ratio by weight between 0.1 and 16.

5. The method according to claim 4, wherein magnesium chloride to cellulose ratio is between 0.5 and 4.

6. The method according to claim 4, wherein the magnesium chloride to cellulose ratio is 1.

7. The method according to claim 1, wherein the preselected relative moisture content is at least 40%.

* * * * *

UNITED STATES PATENT AND TRADEMARK OFFICE
CERTIFICATE OF CORRECTION

PATENT NO. : 10,751,696 B2
APPLICATION NO. : 15/871921
DATED : August 25, 2020
INVENTOR(S) : Crapanzano et al.

Page 1 of 1

It is certified that error appears in the above-identified patent and that said Letters Patent is hereby corrected as shown below:

On the Title Page

Item (73), "Assignee: Dayco Europe S.R.L, Chieti (IT)" should read -- Assignee: PROPAGROUP S.p.A., Rivoli (IT) --

Signed and Sealed this
Thirteenth Day of October, 2020

Andrei Iancu
*Director of the United States Patent and Trademark Office*